July 26, 1960 H. ADAM 2,946,553
BUTTERFLY VALVES
Filed Feb. 14, 1957 2 Sheets-Sheet 1

INVENTOR
Helmut Adam
by Michael S. Striker
agt.

July 26, 1960     H. ADAM     2,946,553
BUTTERFLY VALVES

Filed Feb. 14, 1957     2 Sheets-Sheet 2

INVENTOR
Helmut Adam
by Michael S. Striker
agt.

United States Patent Office 2,946,553
Patented July 26, 1960

2,946,553
BUTTERFLY VALVES

Helmut Adam, Stuttgart-Uhlbach, Germany, assignor to Robert Bosch G.m.b.H., Stuttgart, Germany Filed Feb. 14, 1957, Ser. No. 640,114

6 Claims. (Cl. 251—188)

This invention relates to butterfly valves provided with ring seal to effect the tight closure of a pipe line subjected to high vacuum operation.

In connection with high vacuum pipe lines of large diameter it is known practice to provide closure devices in the nature of disc valves equipped with annular sealing means or sealing rings effective between the valve seat and the disc. Such disc valves have an actuating mechanism so arranged that the valve disc carrying the sealing ring is movable bodily in the axial direction of the pipe onto and away from the valve seat for the purpose of closing and opening the valve respectively. Valves of that type have inherent in them a number of drawbacks and structural disadvantages. For example, it is necessary that the valve chamber or housing be relatively enlarged in order to provide effective cross-sectional through-flow area at least equal to the cross-sectional area of the suction intake of the pump, so that with the valve in open position a smooth passage of the fluid therethrough should be attainable. Furthermore, valve actuating mechanism for that type of valve unit requires the provision of at least a pair of guide bearings, namely one such bearing disposed upstream and one downstream relative to the valve seat, for accommodating the valve actuating rod members of that mechanism. In addition, the valve unit must have extra structural length in order to accommodate those actuating members of the mechanism that must pass outwardly through the wall of the valve housing, such extra length of the valve unit in turn necessitating the provision thereon of special flanges for installing the unit in the line. Another limitation lies in the fact that the manner of installation in turn is governed by the disposition of the vacuum pump in view of the direction in which suction is effected by the pump.

To avoid the drawbacks above indicated, this invention provides, for use in high vacuum lines, an improved butterfly type valve equipped with a sealing ring or annulus of resiliently deformable material, such as rubber, mounted in a peripheral groove upon the swingable disc member of this type of valve. Significantly, in such a valve there is no valve seat in the aforementioned sense, but the straight through flow area of the valve housing is occupied substantially entirely by the swingable butterfly type closure disc of this type of valve.

According to this invention, the rubber ring when seated upon the valve disc in its normal substantially unbiased condition has an outside diameter slightly smaller than the inside diameter of the surrounding wall. But after the valve disc has been swung or turned to valve closing position, special controllable ring-biasing means associated with the disc become effective to subject the ring to a resilient kind of deformation whereby the ring in effect is forced outwardly in a manner to peripherally engage the surrounding wall, and thereby to establish an hermetic sealing relationship between the periphery of the disc and the surrounding wall. Upon relief of the bias, the ring will reassume its normal shape and contour whereby it will clear the surrounding wall of the valve housing.

Accordingly, this invention provides controllable biasing mechanism for the rubber ring, whereby the ring is confined as between the valve disc and a companion pressure plate movably associated therewith, the ring being seated in a peripherally extending gouge upon the disc. Therefore, when the pressure plate is forced towards the disc at the time the disc reaches valve closing position, the resulting deformation of the ring will force the resilient material thereof outwardly to engage peripherally and grip the surrounding wall. Releasing the pressure plate will restore the ring to its unbiased condition enabling it to clear the surrounding wall at the time that the valve is again being opened.

In a practical embodiment, the pressure plate is movable upon the valve disc to and fro by means of a pair of guide members or bolts extending from the pressure plate with adequate clearance through the valve disc and past a transverse actuating shaft which in turn is rotatably mounted in the walls of the valve housing. That is to say, the actuating shaft extends transversely between the two bolts, and is confined between the valve disc and a yoke member rigidly interconnecting the outer ends of the two bolts. The valve disc and pressure plate assembly together with the sealing ring is bodily and operationally supported by the transverse shaft, to be rotated thereby in the opening and closing of the valve.

The actuating shaft in turn is rotatable relative to the valve disc, and is provided with a cam face so arranged that a degree of rotation of the shaft relative to the disc will automatically effect valve sealing deformation of the rubber ring by engaging the yoke member substantially at the time that the disc reaches valve closing position. Initiating the rotation of the actuating shaft in the opposite sense will release the rubber ring so it will resume its normal contour, and free the disc for swinging to the open valve position.

In this way, it becomes possible to minimize the structural length as well as the inside diameter of the valve housing, so that the length need not be greater than the diameter, and the valve unit as a whole can be installed in the pipe line substantially in the form of a short interposed compact connection. The swingable arrangement of the valve disc obviates the need for providing extra cross-sectional area to compensate for sealing space, and renders the installation of the valve free from the aforementioned directional limitations imposed by the location of the vacuum pump.

The drawings show a practical example of the invention as follows.

Figure 1:
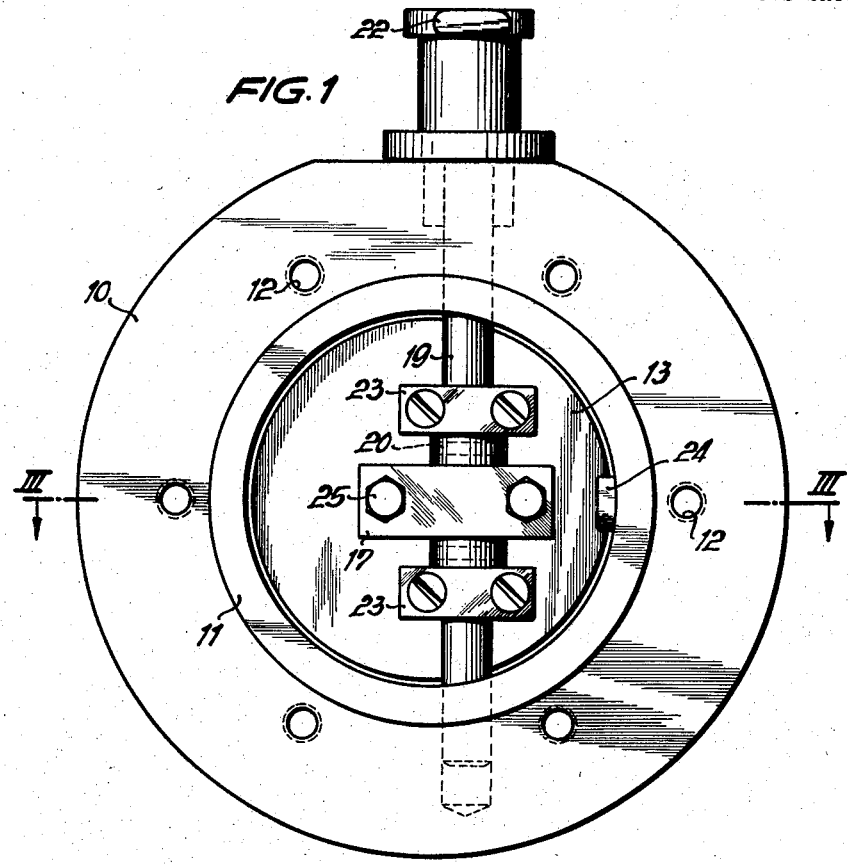
Fig. 1 is a plane view of the valve unit when closed.

The butterfly valve unit according to the drawing Figs. 1 to 4 comprises a valve chamber or main housing 10 formed with cylindrical extensions 11 projecting from each respective side of the housing portion 10, thus providing as a whole a relatively short straight cylindrical flow passage through the housing of relatively small inside diameter. The housing portion 10 is provided with threaded holes 12 for the purpose of connecting this housing with companion flanges of the adjoining section of the pipe line.

The cross-sectional through flow area of the valve body 10 is occupied nearly entirely that is with a peripheral clearance by a valve disc 13 having a reduced or gouged out peripheral portion 13' shaped to receive a sealing ring 14, of flexible resiliently deformable material such as rubber. The sealing ring 14 is confined between the valve disc 13 and a movable pressure plate 15 of substantially the same diameter as the disc and is carried by the disc. The pressure plate 15 is movably and operatively connected with its carrier member or valve disc 13 by means of a pair of guide bolts 16 rigidly extending from the pressure plate 15 and passing with adequate clearance through the valve disc 13, in order to be movable to and fro with respect to that disc. The outer ends of the bolts 16 are rigidly interconnected by means of a yoke plate or member 17 fastened to the guide bolts 16 as by screws 18.

Intermediate the yoke member 17 and the valve disc 13 there lodges a cam member 21 fastened by means of pins 20 upon an actuating shaft 19 rotatable in the walls of valve housing 10. The cam member has a cam 21' adapted to engage upon the yoke member 17 (see Fig. 3) when the shaft 19 is rotated in valve closing direction. When the shaft 19 is turned in valve opening direction, a shoulder 21" of cam 21' abuts against the valve disc 13 so that continued rotation of the shaft will turn the disc to its open or inoperative Fig. 2 position. The valve disc 13 is formed with an arc-shaped recess to accommodate the cam member 21 along the width thereof. One end of the actuating shaft 19 has a closed end bearing in the valve housing 10, whereas the opposite end penetrates the housing wall in hermetically sealed relationship therewith. An actuating handle or lever 22 is fastened upon the outwardly projecting end portion of the shaft, whereby the shaft can be rotated to effect the opening and closing of the valve. The valve disc 13 is movably connected to the shaft 19 by means of a pair of bearing blocks 23 in which the shaft may rotate to provide for the aforementioned rotation of the shaft relative to the disc 13. The bearing blocks 23 are spaced from each other a distance sufficient to accommodate between them the width of cam member 21. Consequently, the guide bolts 16 with yoke member 17 are disposed in a plane transversely of the shaft 19 as well as intermediate and centrally of the two bearing blocks 23.

The rotational movement of the valve disc is limited by abutments or stops 24 and 25. The abutment designated by the numeral 24 is fixed upon the wall of the valve housing facing inwardly, and is designated to limit the closing movement of disc 13. The stop 25 is in the form of the extended hexagon head portion of the fastening screw 18, and designed to limit the opening movement of the disc 13.

Opening and closing of the valve is effected in a simple manner by rotating the actuating shaft 19 through the manipulation of the lever 22.

Figure 3:
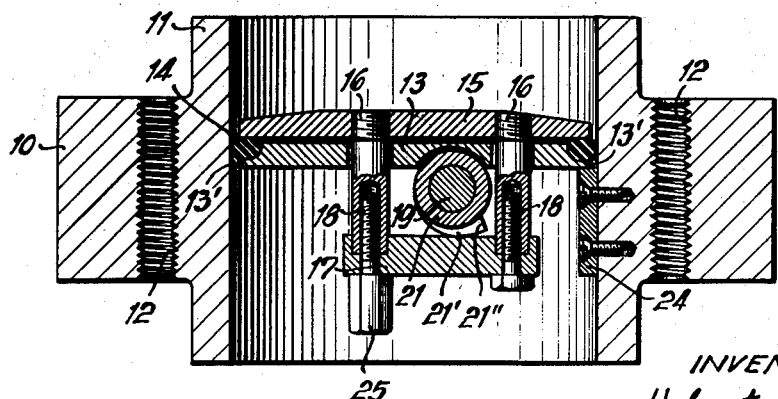
Fig. 3 is a longitudinal sectional view of the valve unit taken on line 3—3 of Fig. 1, and indicating the deformed wall-gripping condition of the rubber seal ring when the valve is closed.
Figure 2:
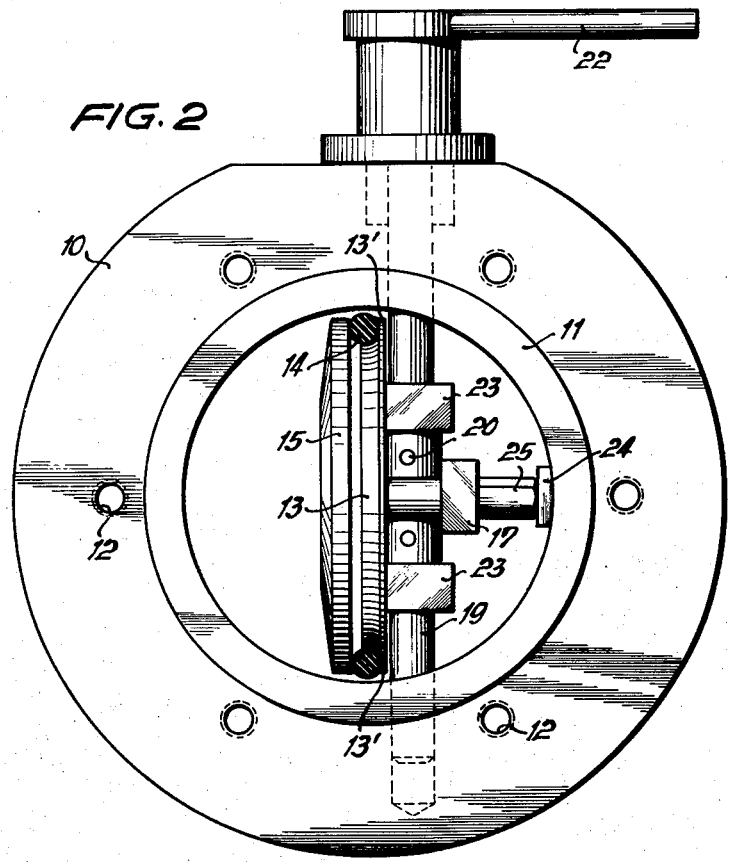
Fig. 2 is a similar plane view of the valve unit when open.

Fig. 3 shows the valve disc 13 in closing position, and the cam member 21' rotated to the active position where it engages and forces the pressure plate 15 towards the valve disc 13, with the result that the sealing ring 14 is deformed in a manner whereby it is urged outwardly and into peripheral gripping engagement with the surrounding wall of the valve housing 10. In this way there is attainable an hermetic closure against high vacuum in the line.

Figure 4:
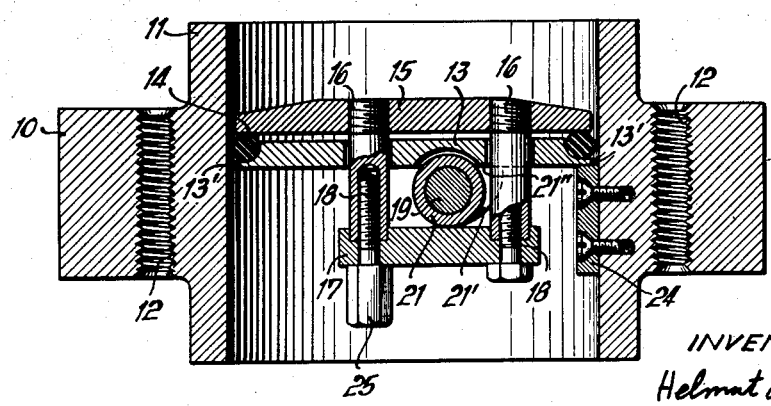
Fig. 4 is a longitudinal sectional view similar to Fig. 3, showing the rubber seal ring released prior to the actual opening of the valve.

Rotating the shaft 19 with cam 21' from the Fig. 3 position back to the Fig. 4 position will release the pressure plate 15 and relieve the sealing ring 14 sufficiently for it to regain its normal or unbiased shape whereby it clears the surrounding wall. Further rotation of shaft 19 with cam member 21' in the valve opening sense will bring the shoulder 21" to engage upon valve disc 13 (see Fig. 4) and thus swing the disc 13 into the open Fig. 2 position.

A highly effective sealing closure is attainable in the operation of this valve unit because of the fact that disc 13 and pressure plate 15 are rotationally movable upon and relative to the actuating shaft 19, so that these plate members 13 and 15 together assume a fixed position with respect to the surrounding wall solely by way of the deformation of the sealing ring peripherally engaging the wall. The improved butterfly valve of this invention readily lends itself for use also in pipe lines of relatively small diameter, for example a diameter of less than 100 mm., to effect closure against high vacuum.

Thus it is clear that the operation of vacuum pipe systems as a whole is benefited to a significant degree by the extreme simplicity and compactness of the valve unit as well as by the superior sealing closure attainable thereby.

As this invention may be embodied in several forms without departing from the spirit or essential characteristics thereof, the present embodiment is therefore illustrative and not restrictive since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

I claim:

1. A butterfly valve unit comprising, in combination, a longitudinally extending substantially cylindrical valve housing, a rotatable actuating shaft extending crosswise of said housing, a valve closure disc carried by said shaft and rotatable thereby for valve closing and opening with a pair of bearing blocks provided on said disk to allow for rotation therein of said shaft relative to said disc, a pressure plate movably anchored upon said disc and constituting therewith a peripheral groove with a sealing ring of resiliently deformable material lodging in said groove and confinable and deformable by actuation of said pressure plate, a pair of guide bolts rigidly extending from said pressure plate through said disc to afford guided movement of said pressure plate relative to said disc, said guide bolts straddling said shaft and having a yoke member rigidly connecting their free ends with one another across said shaft and intermediate said bearing blocks, and a cam member fixedly carried by said shaft between said bearing blocks for actuating said pressure plate incident to rotation of said shaft, whereby said shaft and cam engaging upon said yoke member are operable to deform said ring to effect valve-sealing and wall-engaging deformation thereof when the disc is in valve closing position, and conversely operable to relieve ring pressure to allow the ring to reassume substantially unbiased wall-clearing normal shape and contour preparatory to valve opening.

2. The butterfly valve unit according to claim 1, with the addition that the cam member is provided with a shoulder adapted to engage said disc to rotate therewith upon rotation of said shaft to effect opening of the valve.

3. The butterfly valve unit according to claim 1, with the addition that the cam member is provided with a shoulder adapted to engage said disc to rotate therewith upon rotation of said shaft to effect opening of the valve, and an abutment member fixed upon the wall of said housing for limiting the valve closing movement of the disc.

4. The butterfly valve unit according to claim 1, with the addition that the cam member is provided with a shoulder adapted to engage said disc to rotate therewith upon rotation of said shaft to effect opening of the valve, an abutment member fixed upon the wall of said housing for limiting the valve closing movement of said disc, and a stop for limiting the valve opening movement of the disc, in the form of a lug fixedly carried by said yoke member and shaped to engage the wall of said housing at the end of the opening movement of the disc.

5. A butterfly valve unit comprising, in combination, a tubular valve housing; a closure unit composed of one closure member fitting with clearance in transverse direction into said tubular housing, a pressure member arranged adjacent said closure member at least in the region of the peripheral edge portion thereof, a deformable sealing member arranged between the facing peripheral edge portions of said closure member and said pressure member and means connecting said closure member and said pressure member for movement toward and away from each other; means mounting said closure unit turnably within said tubular valve housing about an axis extending transversely to said housing; and actuating means operable for turning said closure unit from inoperative position extending in direction of said tubular valve housing to operative position extending transversely thereto, and also operable for moving while the unit is in operative position said closure member and said pressure member toward each other so as to deform said sealing member and seal the clearance between said closure member and the inner face of said tubular housing, and for releasing said closure member and said pressure member for movement away from each other so as to permit movement of said sealing member out of sealing position before turning said closure unit from operative back into inoperative position.

6. A butterfly valve unit comprising, in combination, a tubular valve housing; a closure disc member; a pressure member cooperatively associated with said closure member and movable towards and away relative thereto; means for mounting both said members to be turnable jointly about an axis extending transversely of said housing between operative and inoperative position, both said members having peripheral clearance with respect to the surrounding surface of the housing when inoperative position relative thereto; a resiliently deformable peripheral sealing member interposed between said closure member and said pressure member; and seal actuating means operable with said members turned into operative position to move said members towards each other to effect deformation of the sealing means and sealing engagement thereof with the inner face of the valve housing, and operable to effect movement of said members away from each other thereby releasing said sealing means, from engagement with said housing surface to free said members for turning back to said inoperative position.

References Cited in the file of this patent
UNITED STATES PATENTS

| | | |
|---|---|---|
| 245,731 | Linke | Aug. 16, 1881 |
| 1,014,775 | Rothchild | Jan. 16, 1912 |
| 1,706,123 | McBride | Mar. 19, 1929 |
| 1,834,870 | Rogers | Dec. 1, 1931 |
| 1,918,184 | Hartman | July 11, 1933 |
| 2,081,842 | Sharp | May 25, 1937 |
| 2,612,338 | Flosdorf | Sept. 30, 1952 |
| 2,655,942 | Dougherty | Oct. 20, 1953 |
| 2,843,353 | Marden | July 15, 1958 |
| 2,853,267 | Herren | Sept. 23, 1958 |

FOREIGN PATENTS

| | | |
|---|---|---|
| 1,026,587 | Germany | Mar. 20, 1958 |